(12) United States Patent
Gore et al.

(10) Patent No.: US 7,418,046 B2
(45) Date of Patent: *Aug. 26, 2008

(54) PILOT TRANSMISSION AND CHANNEL ESTIMATION FOR MULTIPLE TRANSMITTERS

(75) Inventors: Dhananjay Ashok Gore, San Diego, CA (US); Avneesh Agrawal, San Diego, CA (US); Tamer Kadous, San Diego, CA (US)

(73) Assignee: QUALCOMM Inc., San Diego, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 11/022,146

(22) Filed: Dec. 22, 2004

(65) Prior Publication Data

US 2006/0018411 A1 Jan. 26, 2006

Related U.S. Application Data

(60) Provisional application No. 60/590,864, filed on Jul. 22, 2004.

(51) Int. Cl.
*H04K 1/10* (2006.01)
*H04L 27/28* (2006.01)

(52) U.S. Cl. .................. 375/260; 375/140; 375/144; 375/346; 375/349; 370/328; 370/441

(58) Field of Classification Search .................. 375/140, 375/144, 346, 349, 350; 370/328, 441
See application file for complete search history.

(56) References Cited

U.S. PATENT DOCUMENTS 6,999,467 B2 * 2/2006 Krauss et al. ............... 370/441

(Continued)

FOREIGN PATENT DOCUMENTS

EP 1414177 A1 9/2003

(Continued)

OTHER PUBLICATIONS

U. S. appl. No. 11/020,888.*

*Primary Examiner*—Phuong Phu
(74) *Attorney, Agent, or Firm*—Sandip S. Minhas; Peng Zhu; Thomas R. Rouse

(57) ABSTRACT

Each transmitter is assigned a time-only pilot code, a frequency-only pilot code, or a time-frequency pilot code to use for pilot transmission. The pilot codes may be pseudo-random, orthogonal, and/or cyclic-shift codes. To obtain a channel estimate for a transmitter using a time-frequency pilot code composed of a time-only code and a frequency-only code, a receiver multiplies a set of received symbols for each symbol period with a set of code values for the frequency-only code to obtain a set of detected symbols and performs an IDFT on the set of detected symbols to obtain an initial impulse response estimate. The receiver performs code matching on multiple initial impulse response estimates derived for multiple symbol periods with the time-only code to obtain a final impulse response estimate for the desired transmitter. The receiver retains the first L channel taps and zeroes out remaining channel taps, where L is the expected channel length.

32 Claims, 10 Drawing Sheets

U.S. PATENT DOCUMENTS

| | | | |
|---|---|---|---|
| 2002/0122381 A1 | 9/2002 | Wu et al. | 370/208 |
| 2004/0252629 A1* | 12/2004 | Hasegawa et al. | 370/208 |
| 2005/0084000 A1* | 4/2005 | Krauss et al. | 375/148 |
| 2005/0195763 A1* | 9/2005 | Kadous et al. | 370/328 |
| 2005/0249181 A1* | 11/2005 | Vujayan et al. | 370/344 |
| 2006/0291578 A1* | 12/2006 | Singh et al. | 375/260 |

FOREIGN PATENT DOCUMENTS

| | | |
|---|---|---|
| WO | WO02/082683 A2 | 10/2002 |
| WO | WO02/061170 A1 | 7/2003 |

* cited by examiner

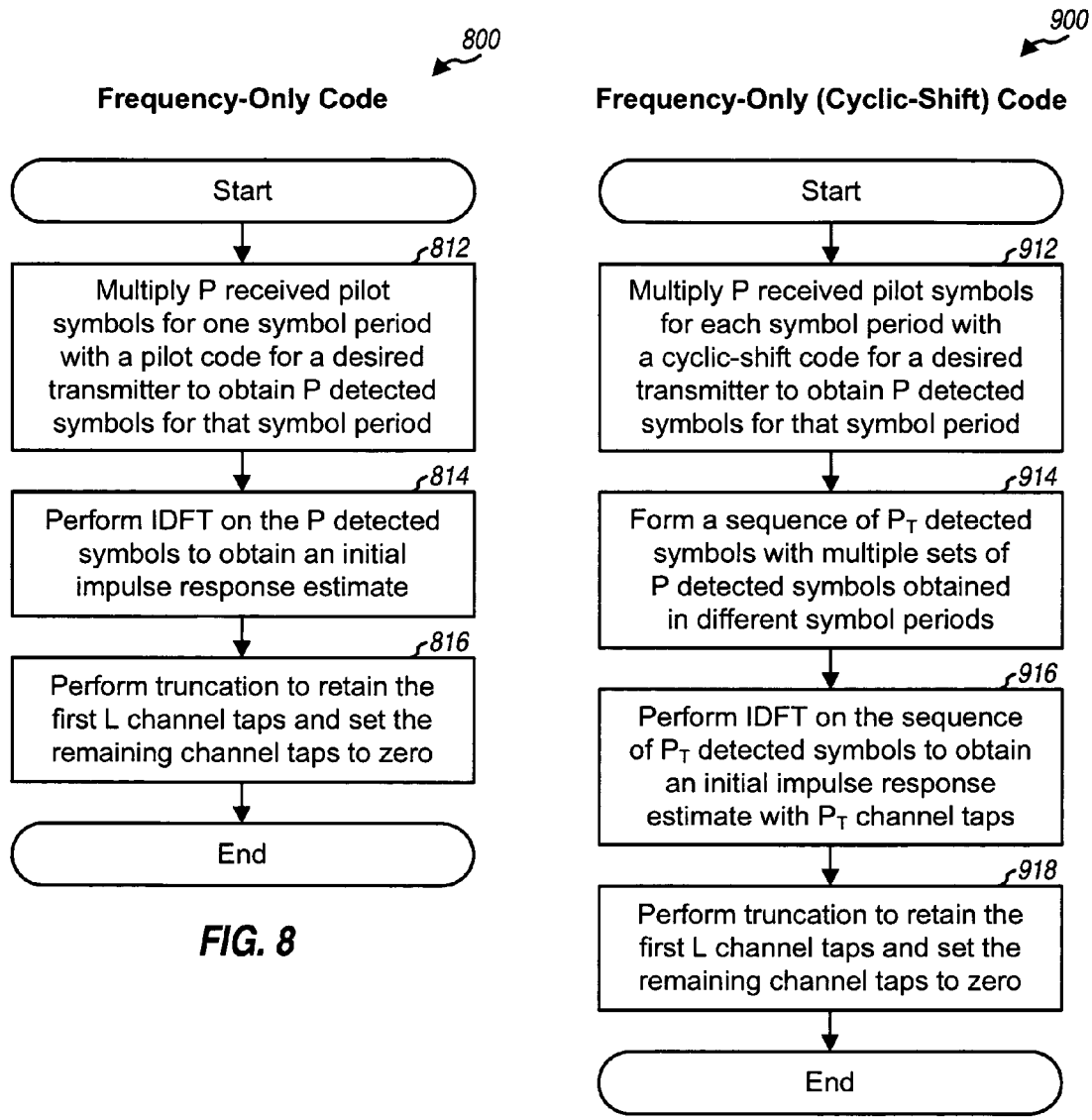

PILOT TRANSMISSION AND CHANNEL ESTIMATION FOR MULTIPLE TRANSMITTERS

CROSS-REFERENCE TO RELATED APPLICATIONS

The present Application for Patent claims priority to Provisional Application No. 60/590,864, entitled "Pilot Transmission Schemes for a Multi-Antenna System" filed Jul. 22, 2004, and assigned to the assignee hereof and hereby expressly incorporated by reference herein.

BACKGROUND

I. Field

The present invention relates generally to communication, and more specifically to pilot transmission and channel estimation in a wireless communication system.

II. Background

In a wireless communication system, it is often necessary to estimate the response of a wireless channel from a transmitter to a receiver. The channel estimate may be used for various purposes such as data detection, time synchronization, frequency correction, spatial processing, rate selection, and so on. Channel estimation is typically performed by transmitting a pilot signal containing pilot symbols that are known a priori by both the transmitter and receiver. The receiver can then estimate the channel gains as a ratio of the received pilot symbols over the known pilot symbols.

The pilot signal is typically impaired by both noise and interference. These impairments degrade the quality of the channel estimate obtained by the receiver based on the received pilot signal. The noise can come from various sources such as the wireless channel, receiver electronics, and so on. Noise impairment can normally be addressed by transmitting the pilot signal in a proper manner and/or for a sufficient period of time such that the receiver can obtain the desired quality for the channel estimate. The interference can result from multiple transmitters transmitting their pilot signals simultaneously. These transmitters may be for different base stations in the system, different antennas of the same base station, and so on. In any case, the pilot signal from each transmitter acts as interference to the pilot signals from other transmitters. This pilot interference degrades the quality of the channel estimate.

There is therefore a need in the art for techniques to obtain a high quality channel estimate in the presence of multiple transmitters.

SUMMARY

Techniques for transmitting pilots from multiple transmitters and performing channel estimation for these transmitters are described herein. These techniques can suppress or cancel pilot interference and provide higher quality channel estimates. Each transmitter is assigned a time-only pilot code, a frequency-only pilot code, or a time-frequency pilot code to use for pilot transmission. The pilot codes may be pseudo-random codes, orthogonal codes (e.g., Walsh codes), cyclic-shift codes, and so on, or combinations thereof. Each transmitter transmits its pilot on either a fixed set of frequency subbands or different sets of frequency subbands in different symbol periods and further using its assigned pilot code.

The processing performed by a receiver to obtain a channel estimate for each transmitter of interest as well as the quality of the channel estimate are dependent on the pilot codes used by the transmitters and the manner in which the pilots are transmitted, as described below. For example, each transmitter may use a time-frequency pilot code composed of a time-only code and a frequency-only code for pilot transmission. The receiver may then obtain a channel estimate for a desired transmitter as follows. For each symbol period with pilot transmission, the receiver obtains a set of received symbols for a set of frequency subbands used for pilot transmission in that symbol period. The receiver multiplies the set of received symbols with a set of code values for the frequency-only code assigned to the desired transmitter and obtains a set of detected symbols. The receiver performs an inverse transform (e.g., an inverse discrete Fourier transform (IDFT)) on each set of detected symbols to obtain an initial impulse response estimate. The receiver then performs code matching on multiple initial impulse response estimates obtained for multiple symbol periods with the time-only code assigned to the desired transmitter to obtain a final impulse response estimate for the desired transmitter, as described below. The receiver may perform truncation to retain the first L channel taps of the final impulse response estimate and zero out the remaining channel taps. L may be the expected length of the channel impulse response for the desired transmitter. The receiver may also perform channel estimation in other manners, as described below.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 8 shows a channel estimation process for a frequency-only pilot code.

FIG. 9 shows a channel estimation process for a staggered pilot with a cyclic-shift code.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The pilot transmission and channel estimation techniques described herein may be used for various wireless communication systems. These techniques may be used for the downlink as well as the uplink. The downlink or forward link refers to the communication link from a base station to a wireless device, and the uplink or reverse link refers to the communication link from the wireless device to the base station. A base station is generally a fixed station that communicates with the wireless devices and may also be called a base transceiver system (BTS), an access point, or some other terminology. A wireless device may be fixed or mobile and may also be called a user terminal, a mobile station, a handset, or some other terminology.

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The techniques described herein may also be used with various multi-carrier modulation techniques such as orthogonal frequency division multiplexing (OFDM). OFDM effectively partitions the overall system bandwidth into multiple (K) orthogonal frequency subbands. These subbands are also called tones, subcarriers, bins, and frequency channels. With OFDM, each subband is associated with a respective subcarrier that may be modulated with data.

Figure 1:
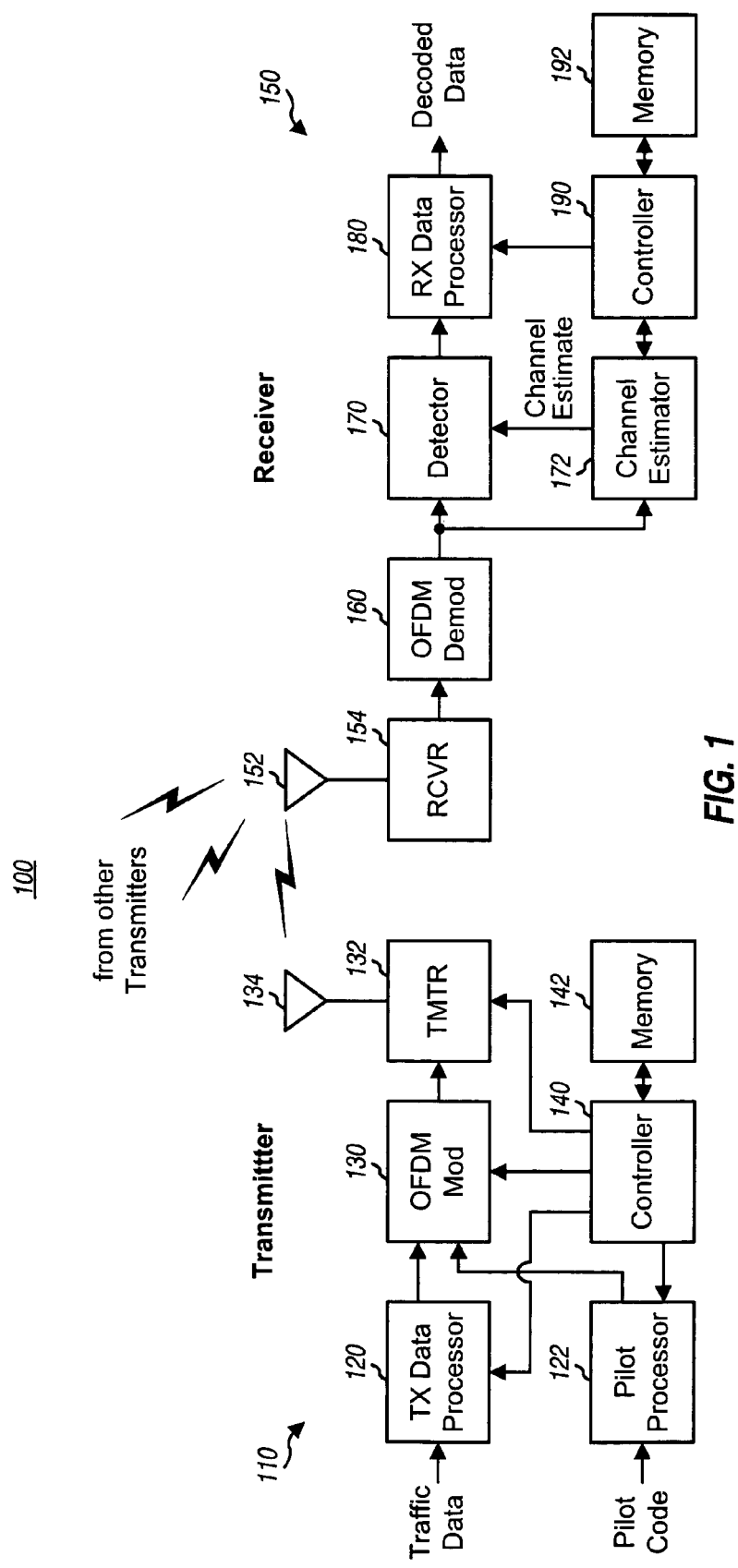
FIG. 1 shows a block diagram of a transmitter and a receiver.

FIG. 1 shows a block diagram of a transmitter 110 and a receiver 150 in a wireless communication system 100. Transmitter 110 may be part of a base station and receiver 150 may be part of a wireless device. Alternatively, transmitter 110 may be part of a wireless device and receiver 150 may be part of a base station. In general, a base station may include any number of transmitters and any number of receivers. A wireless device may likewise include any number of transmitters and any number of receivers.

At transmitter 110, a transmit (TX) data processor 120 receives different types of data such as, e.g., traffic/packet data and overhead/control data. TX data processor 120 processes (e.g., encodes, interleaves, and symbol maps) the data to generate data symbols and provides the data symbols to an OFDM modulator (Mod) 130. As used herein, a data symbol is a modulation symbol for data, a pilot symbol is a modulation symbol for a pilot signal, a code symbol is a pilot symbol multiplied with a code value, and a modulation symbol is a complex value for a point in a signal constellation for a modulation scheme (e.g., M-PSK, M-QAM, and so on). The pilot symbols and code symbols are known a priori by both the transmitter and receiver. A pilot processor 122 receive a pilot code assigned to transmitter 110, generates code symbols based on the pilot code as described below, and provides the code symbols to OFDM modulator 130.

OFDM modulator 130 multiplexes the data and code symbols onto the proper subbands and OFDM symbol periods and performs OFDM modulation on the multiplexed symbols to generate OFDM symbols. For each OFDM symbol period, OFDM modulator 130 performs a K-point inverse fast Fourier transform (IFFT) on K multiplexed symbols for the K total subbands and generates a transformed symbol that contains K time-domain samples. Each sample is a complex value to be transmitted in one sample period. OFDM modulator 130 then repeats a portion of each transformed symbol to form an OFDM symbol that contains K+C samples, where C is the number of samples being repeated. The repeated portion is often called a cyclic prefix and is used to combat inter-symbol interference (ISI) caused by frequency selective fading. An OFDM symbol period (or simply, a symbol period) is the duration of one OFDM symbol and is equal to K+C sample periods. OFDM modulator 130 provides a stream of OFDM symbols to a transmitter unit (TMTR) 132. Transmitter unit 132 processes (e.g., converts to analog, amplifies, filters, and frequency upconverts) the OFDM symbol stream and generates a modulated signal, which is transmitted from an antenna 134.

At receiver 150, an antenna 152 receives the modulated signals transmitted by transmitter 110 as well as other transmitters and provides a received signal to a receiver unit (RCVR) 154. Receiver unit 154 processes (e.g., filters, amplifies, frequency downconverts, and digitizes) the received signal and provides a stream of received samples. An OFDM demodulator (Demod) 160 performs OFDM demodulation on the received samples. For each OFDM symbol period, OFDM demodulator 160 removes the cyclic prefix appended to a received OFDM symbol, performs a K-point fast Fourier transform (FFT) on K received samples for the OFDM symbol period, and generates K received symbols for the K total subbands. OFDM demodulator 160 provides received data symbols to a detector 170 and received pilot symbols to a channel estimator 172.

Channel estimator 172 derives a channel estimate for the wireless channel between transmitter 110 and receiver 150 based on the received pilot symbols, as described below. Detector 170 performs data detection (e.g., equalization or matched filtering) on the received data symbols with the channel estimate from channel estimator 172 and provides data symbol estimates, which are estimates of the data symbols sent by transmitter 110. A receive (RX) data processor 180 processes (e.g., symbol demaps, deinterleaves, and decodes) the data symbol estimates and provides decoded data. In general, the processing by OFDM demodulator 160, RX data processor 180, and channel estimator 172 is complementary to the processing by OFDM modulator 130, TX data processor 120, and pilot processor 122, respectively, at transmitter 110.

Controllers 140 and 190 direct operation at transmitter 110 and receiver 150, respectively. Memory units 142 and 192 store program codes and data used by controllers 140 and 190, respectively.

Figure 2:
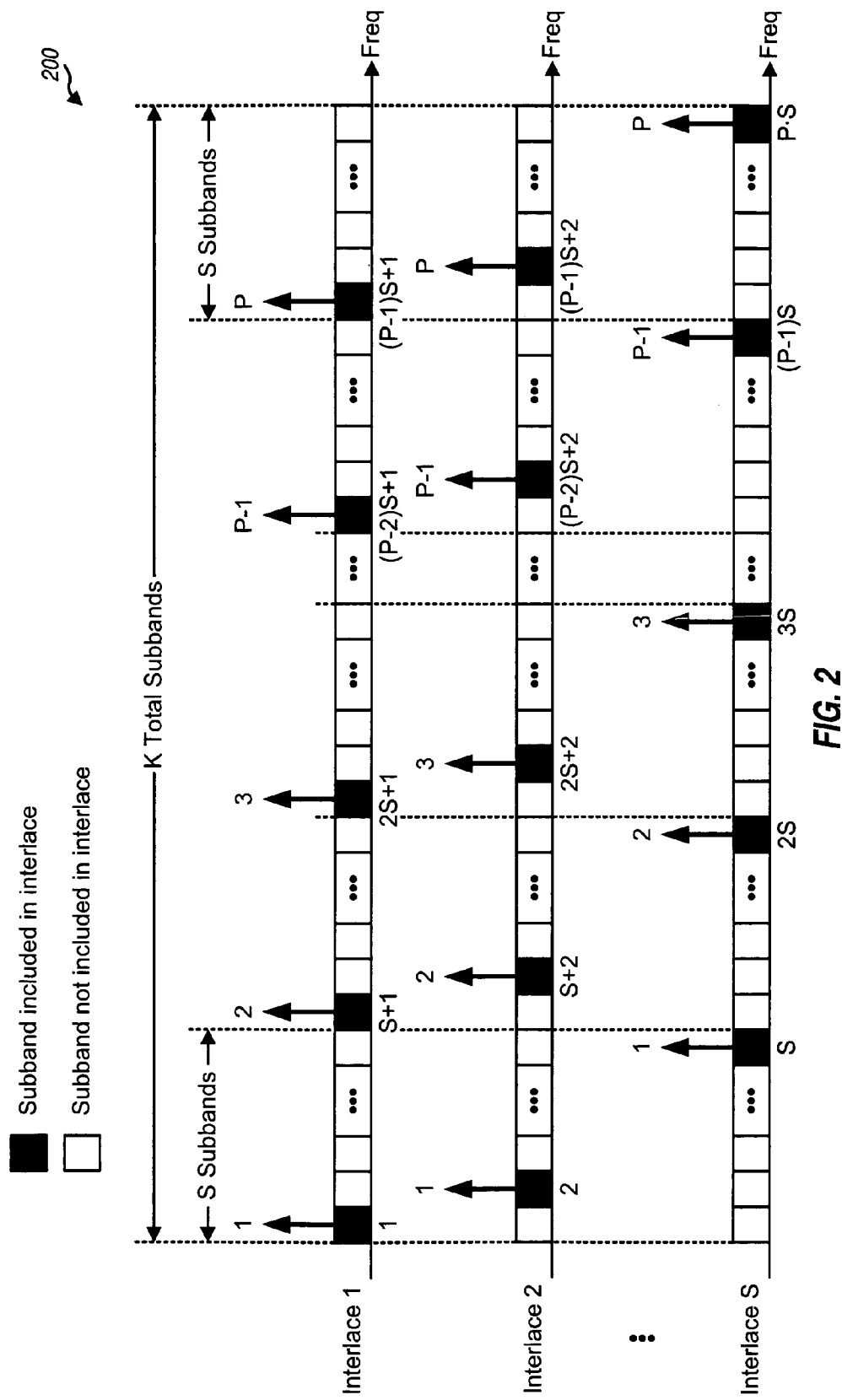
FIG. 2 shows an interlace subband structure.

FIG. 2 shows an interlace subband structure 200 that may be used for pilot transmission in system 100. The overall system bandwidth is partitioned into K frequency subbands using OFDM. For simplicity, the following description assumes that all K subbands are usable for transmission and are assigned indices of k=1, ..., K. The K total subbands are arranged into S "interlaces", which may also be called subband groups or sets. Each interlace contains P subbands with indices of p=1, ..., P, where P=K/S. The P subbands for each interlace may be uniformly distributed across the K total subbands such that consecutive subbands in the interlace are spaced apart by S subbands. A pilot may be transmitted on one interlace in each symbol period with pilot transmission. The pilot subbands are subbands used for pilot transmission.

In general, system 100 may utilize any OFDM structure with any number of total and pilot subbands. For clarity, the following description is for the OFDM structure shown in FIG. 2 with P pilot subbands uniformly distributed across the K total subbands. This pilot structure allows the receiver to estimate the channel gains across the entire system bandwidth and further allows the receiver to perform P-point inverse transforms instead of K-point inverse transforms for channel estimation.

In the following description, a desired transmitter is a transmitter whose wireless channel is being estimated. An interfering transmitter is a transmitter that causes interference to the desired transmitter and affects the channel estimation. A receiver may receive pilot signals from any number of transmitters, which may be for the same or different transmitting entities (e.g., base stations). The receiver may derive channel estimates for multiple transmitters based on pilot signals received from these transmitters. Each transmitter is the desired transmitter for its channel estimate and an interfering transmitter for the channel estimates for other transmitters.

The transmitters may be synchronous and may transmit their pilot signals simultaneously on the same pilot subbands in the same symbol periods. The pilot signals would then interfere with one another. To facilitate channel estimation in the presence of multiple transmitters, each transmitter may multiply its pilot symbols with a pilot code assigned to that transmitter. The pilot codes for different transmitters are designed such that a good channel estimate may be obtained for any transmitter of interest.

Table 1 lists some pilot code types and schemes that may be used for pilot transmission. A time-only code is a code that is only a function of time or symbol periods. A frequency-only code is a code that is only a function of frequency or subbands. The time-only codes $T_i(n)$ for different transmitters may be pseudo-random or orthogonal with respect to each other. The frequency-only codes $F_i(k)$ for different transmitters may be pseudo-random with respect to each other or may be different cyclic-shift codes. Pseudo-random codes may be generated with pseudo-random number (PN) generators. Orthogonal codes may be Walsh codes, orthogonal variable spreading factor (OVSF) codes, and so on. The pilot code assigned to each transmitter may be a time-only code, a frequency-only code, or a combination of time-only code and frequency-only code. The various types of pilot codes are described below.

Figure 3:
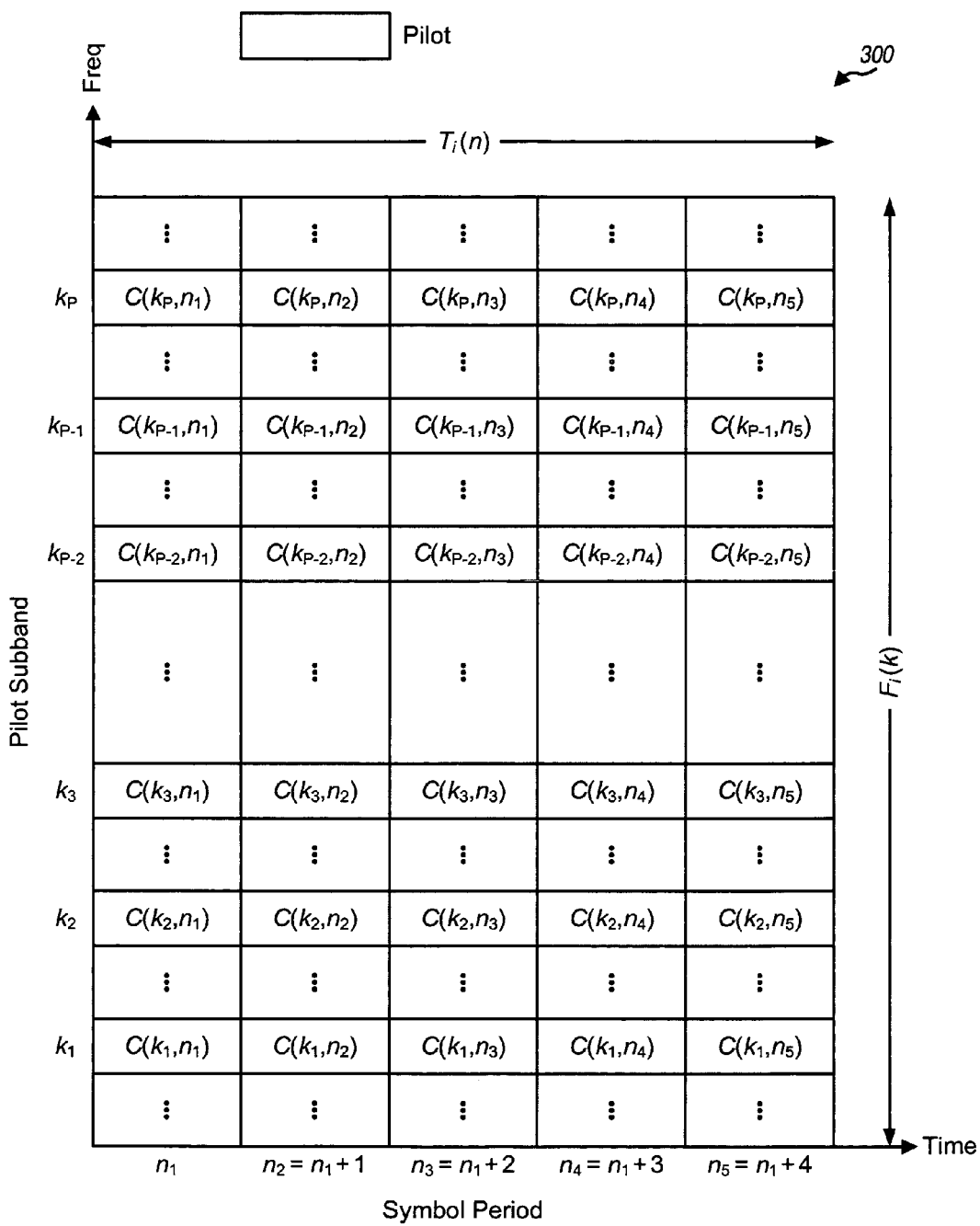
FIG. 3 shows a fixed pilot transmission scheme.

FIG. 3 shows a fixed pilot transmission scheme 300 that uses a single interlace for pilot transmission in all symbol periods. The code symbols for each transmitter may be generated based on the time-only code $T_i(n)$ and/or the frequency-only code $F_i(k)$ assigned to that transmitter. The code symbols for the desired transmitter are shown in FIG. 3. The pilot may be transmitted in each symbol period, as shown in FIG. 3, or in only some symbol periods.

Figure 4:
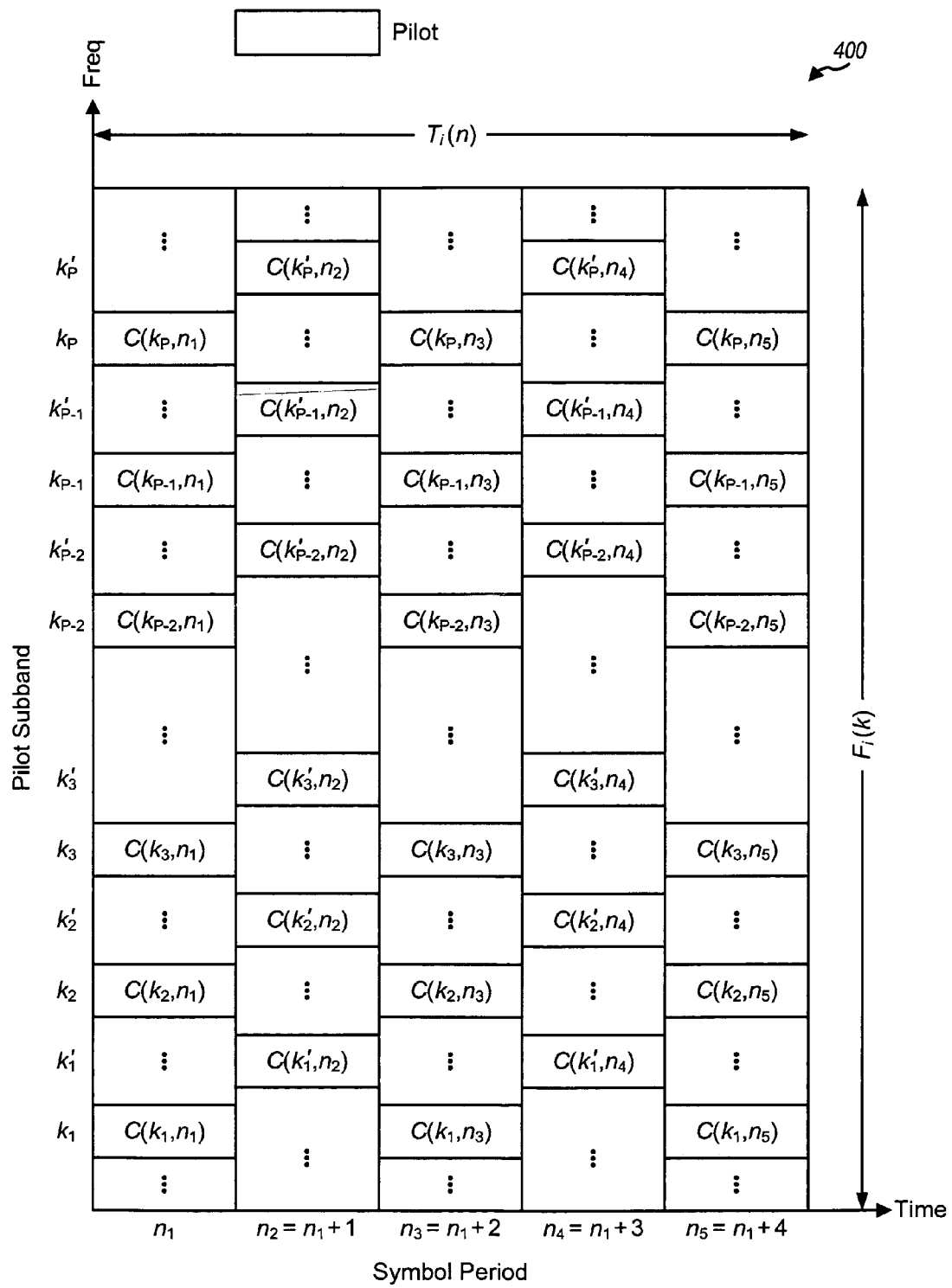
FIG. 4 shows a staggered pilot transmission scheme.

FIG. 4 shows a staggered pilot transmission scheme 400 that uses two interlaces for pilot transmission in alternating symbol periods. In general, any number of interlaces may be used for pilot transmission. The specific interlace to use for pilot transmission in each symbol period may be selected based on a predetermined pattern or in a pseudo-random manner. The code symbols for each transmitter may be generated based on the time-only code $T_i(n)$ and/or the frequency-only code $F_i(k)$ assigned to that transmitter. The code symbols for the desired transmitter are shown in FIG. 4.

For both the fixed and staggered pilot transmission schemes, the P subbands used for pilot transmission in each symbol period n are called pilot subbands and are denoted as $K_{pilot}(n)$. The pilot subbands are known to both the transmitter and receiver.

Figure 5:
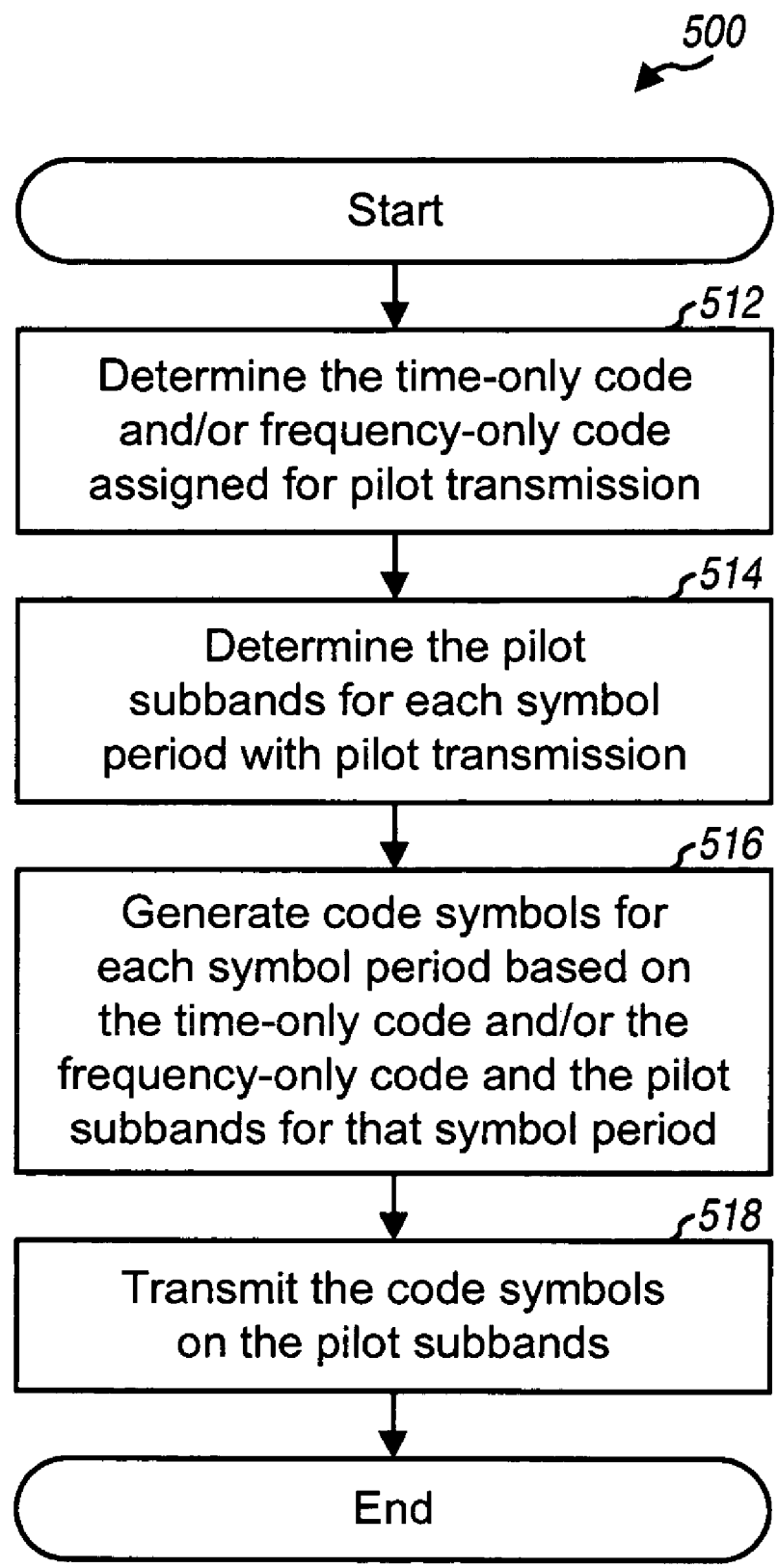
FIG. 5 shows a process for transmitting a pilot.

FIG. 5 shows a process 500 for transmitting a pilot by a transmitter. Initially, the transmitter determines the time-only code and/or the frequency-only code assigned to the transmitter for pilot transmission (block 512). The transmitter determines the pilot subbands for each symbol period with pilot transmission (block 514). Different interlaces may be used in different symbol periods, and the frequency-only code may be dependent on the specific subbands used for pilot

TABLE 1

| Pilot Code Scheme | Time-Only Code $T_i(n)$ | Frequency-Only Code $F_i(k)$ | Pilot Code $S_i(k, n)$ | Pilot Code Type |
|---|---|---|---|---|
| 1 | Pseudo-random | — | $S_i(k, n) = T_i(n)$ | Time-Only |
| 2 | Orthogonal | — | $S_i(k, n) = T_i(n)$ | Pilot Code |
| 3 | — | Pseudo-random | $S_i(k, n) = F_i(k)$ | Frequency-Only |
| 4 | — | Cyclic-Shift | $S_i(k, n) = F_i(k)$ | Pilot Code |
| 5 | Pseudo-random | Pseudo-random | $S_i(k, n) = T_i(n) \cdot F_i(k)$ | Time- |
| 6 | Orthogonal | Pseudo-random | $S_i(k, n) = T_i(n) \cdot F_i(k)$ | Frequency |
| 7 | Pseudo-random | Cyclic-Shift | $S_i(k, n) = T_i(n) \cdot F_i(k)$ | Pilot Code |
| 8 | Orthogonal | Cyclic-Shift | $S_i(k, n) = T_i(n) \cdot F_i(k)$ | |

As shown in Table 1, a time-frequency pilot code may be formed by a product of a time-domain code and a frequency-only code, as follows;

$$S_i(k,n)=T_i(n) \cdot F_i(k), \text{ for } i=0, \ldots, M, \quad \text{Eq (1)}$$

where $T_i(n)$ is a time-only code assigned to the i-th transmitter;

$F_i(k)$ is a frequency-only code assigned to the i-th transmitter; and $S_i(k,n)$ is a time-frequency pilot code assigned to the i-th transmitter.

For clarity, in the following description, index i=0 is for a desired transmitter, and indices i=1, . . . , M are for M interfering transmitters, where M may be any integer value. Each pilot code value is a complex value with unit magnitude, so that $S_i(k,n) \cdot S^*_i(k,n)=1$, where $S^*(k,n)$ is a complex conjugate of $S(k,n)$.

The transmitters may transmit their pilots using various pilot transmission schemes. The manner in which the pilots are transmitted affects the processing performed by the receiver for channel estimation. Two exemplary pilot transmission schemes are described below.

transmission. The transmitter generates code symbols for each symbol period with pilot transmission based on (1) the assigned time-only code and/or frequency-only code and (2) the pilot subbands for that symbol period (block 516). The transmitter then transmits the code symbols on the pilot subbands (block 518).

1. Time-Only Pilot Codes

For a time-only pilot code, the pilot code is the same for all pilot subbands and only varies across symbol periods. The code symbols sent by the desired transmitter may be expressed as:

$$C(k,n)=S_0(n) \cdot P(k), \text{ for } k \in K_{pilot}(n), \quad \text{Eq (2)}$$

where

P(k) is a pilot symbol for subband k; and

C(k,n) is a code symbol sent on subband k in symbol period n.

Equation (2) assumes that the same pilot symbol P(k) is used for subband k in all symbol periods.

The code symbols sent by each interfering transmitter may be expressed as:

$$X_i(k,n) = S_i(n) \cdot P(k), \text{ for } k \in K_{pilot}(n) \text{ and } i=1, \ldots, M, \quad \text{Eq (3)}$$

where $X_i(k,n)$ is a code symbol sent on subband k in symbol period n by the i-th interfering transmitter.

The received symbols for the P pilot subbands (or simply, the received pilot symbols) at the receiver may be expressed as:

$$Y(k,n) = \sqrt{E_d} \cdot H(k,n) \cdot C(k,n) + \sum_{i=1}^{M} \sqrt{E_i} \cdot G_i(k,n) \cdot X_i(k,n) + W(k,n), \quad \text{Eq (4)}$$

where

Y(k,n) is a received pilot symbol for subband k in symbol period n;

H(k,n) is a channel gain from the desired transmitter to the receiver for subband k in symbol period n;

$E_d$ is the transmit power used for the pilot by the desired transmitter;

$G_i(k,n)$ is a channel gain from the i-th interfering transmitter to the receiver for subband k in symbol period n;

$E_i$ is the transmit power used for the pilot by the i-th interfering transmitter; and W(k,n) is the noise on subband k in symbol period n at the receiver.

The noise W(k,n) may be assumed to be additive white Gaussian noise (AWGN) with zero mean and a variance of $N_0$.

Each transmitter transmits its pilot at a power level determined by system specifications, regulatory constraints, and so on. The desired and interfering transmitters may transmit their pilots at the same or different power levels. The pilot power levels affect the quality of the channel estimate but generally does not alter the processing by the receiver for channel estimation.

For simplicity, the following description assumes that all transmitters transmit their pilots at unit power, so that $E_d = E_i = 1$ for all i. Furthermore, the pilot symbols are assumed to have values of P(k)=1+j0, so that $C(k,n)=C(n)=T_0(n)$ and $X_i(k,n)=X_i(n)=T_i(n)$ for the time-only pilot code. The received pilot symbols may then be expressed as:

$$Y(k,n) = H(k,n) \cdot C(n) + \sum_{i=1}^{M} G_i(k,n) \cdot X_i(n) + W(k,n), \text{ for } k \in K_{pilot}(n). \quad \text{Eq (5)}$$

The receiver processes the received pilot symbols to obtain an estimate of the response of the wireless channel from the desired transmitter to the receiver. This wireless channel may be characterized by either a channel impulse response or a channel frequency response. As used herein, and which is consistent with conventional terminology, a "channel impulse response" or "impulse response" is a time-domain response of the wireless channel, and a "channel frequency response" or "frequency response" is a frequency-domain response of the wireless channel. In a sampled-data system, the channel frequency response is the discrete Fourier transform (DFT) of the channel impulse response.

The receiver may obtain a channel estimate for the desired transmitter by performing pilot code matching (or simply, code matching) in the time domain or the frequency domain. Code matching refers to the processing with the pilot code of the desired transmitter to obtain the channel estimate for the desired transmitter and to either suppress or cancel the pilot interference from the other transmitters.

Figure 6:
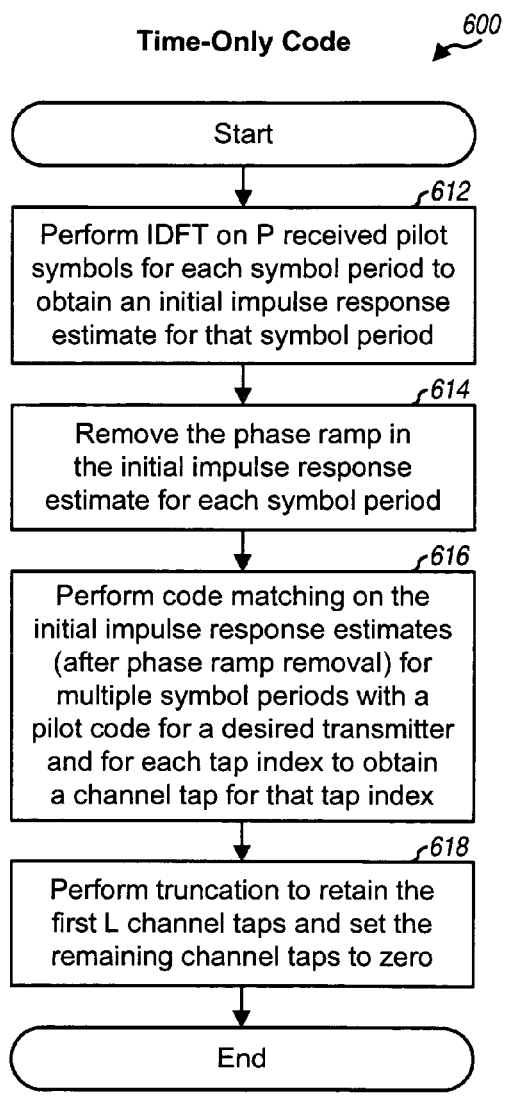
FIG. 6 shows a channel estimation process that performs pilot code matching in the time domain for a time-only pilot code.

FIG. 6 shows a process 600 for deriving a channel estimate by performing code matching in the time domain for a time-only pilot code. For this embodiment, the receiver obtains an initial impulse response estimate (which is a sequence of time-domain samples) for each symbol period and then performs code matching for each channel tap to obtain a final impulse response estimate for the desired transmitter. Initially, the receiver performs an inverse transform on the P received pilot symbols, Y(k,n) for $k \in K_{pilot}(n)$, for each symbol period n to obtain an initial impulse response estimate, y(l,n) for l=1, ..., P, for that symbol period (block 612). The inverse transform may be an IDFT or some other linear transform.

The initial impulse response estimate contains a phase ramp across the P channel taps. The slope of the phase ramp is determined by the index of the first pilot subband. The phase ramp may be removed (block 614) by multiplying each channel tap as follows:

$$\tilde{y}(l,n) = W_K^{-k_n \cdot l} \cdot y(l,n) \quad \text{Eq (6)}$$
$$= e^{j2\pi \frac{(k_n-1)(l-1)}{K}} \cdot y(l,n),$$
$$\text{for } l = 1, \ldots, P,$$

where $k_n$ is the index of the first pilot subband for symbol period n; and $\tilde{y}(l,n)$ is the l-th channel tap for symbol period n after phase ramp removal.

The terms "$k_n-1$" (instead of "$k_n$") and "l–1" (instead of "l") in the exponent in equation (6) are due to the indices starting at 1 instead of 0. Index $k_n$ is fixed for all symbol periods for the fixed pilot transmission scheme and is different for different symbol periods for the staggered pilot transmission scheme. The phase ramp removal and inverse transform may also be performed concurrently in one step using an appropriate inverse transform matrix.

The receiver performs code matching on the initial impulse response estimates (after phase ramp removal) for multiple symbol periods with the time-only code (block 616). The code matching for each tap index (or tap position) l may be performed as follows:

$$\tilde{h}(l) = \sum_{n=1}^{R} C^*(n) \cdot \tilde{y}(l,n), \text{ for } l = 1, \ldots, P, \quad \text{Eq (7)}$$

where $\tilde{h}(l)$ is the l-th channel tap for the desired transmitter; and

R is the length of the time-only code.

As shown in equation (7), the R channel taps in the initial impulse response estimates at each tap index/position l are first multiplied with the conjugated code values of the pilot code assigned to the desired transmitter. The results are then accumulated to obtain the channel tap for that tap index/position l.

The channel impulse response for the desired transmitter may be assumed to have a length of L, where L<P. In this case, the receiver may truncate the impulse response estimate obtained from equation (7) and set each of channel taps L+1 through P to zero (block 618). This truncation may be expressed as follows:

$$\hat{h}(l) = \begin{cases} \tilde{h}(l) & \text{for } l = 1, \ldots, L \\ 0 & \text{for } l = L+1, \ldots, P, \end{cases} \quad \text{Eq (8)}$$

where ĥ(l) is the l-th channel tap for the final impulse response estimate for the desired transmitter. The truncation removes the noise in the excess channel taps with tap indices greater than L. If channel taps L+1 through P are truncated, then the receiver may perform code matching for only the first L channel taps in block 616 and omit block 618.

The time-domain code matching shown in FIG. 6 may be used for both the fixed and staggered pilot transmission schemes. Any interlace may be used for pilot transmission. The receiver removes the phase ramp associated with the interlace used for pilot transmission, as shown in equation (6), prior to performing the code matching.

Figure 7:
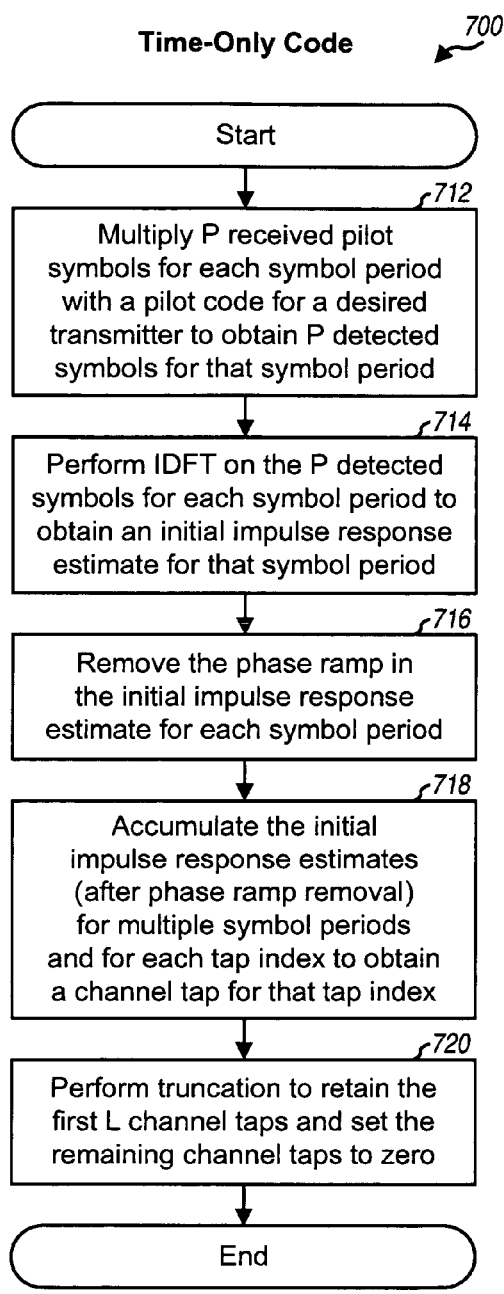
FIG. 7 shows a channel estimation process that performs pilot code matching in the frequency domain for a time-only pilot code.

FIG. 7 shows a process 700 for deriving a channel estimate by performing code matching in the frequency domain for a time-only pilot code. For this embodiment, the receiver performs code matching on the received pilot symbols to obtain detected symbols and then derive an impulse response estimate for the desired transmitter. Initially, the receiver multiplies the P received pilot symbols, Y(k,n) for k∈$K_{pilot}$(n), for each symbol period n with the pilot code for the desired transmitter to obtain the detected symbols, Z(k,n) for k∈$K_{pilot}$(n), for that symbol period (block 712). The detected symbols may be expressed as:

$$Z(k, n) = C^*(n) \cdot Y(k, n), \quad \text{Eq (9)}$$
$$= H(k, n) + \sum_{i=1}^{M} G_i(k, n) \cdot R_i(n) + \tilde{W}(k, n),$$
$$\text{for } k \in K_{pilot}(n),$$

where C(n)·C*(n)=1, $R_i(n) = X_i(n) \cdot C^*(n)$, and $\tilde{W}(k,n) = W(k,n) \cdot C^*(n)$. Equation (9) indicates that the P detected symbols for each symbol period are P channel gain estimates for P pilot subbands. These channel gain estimates are degraded by both pilot interference from the other transmitters and noise.

The receiver then performs an inverse transform (e.g., an IDFT) on the P detected symbols for each symbol period to obtain a P-tap initial channel impulse response estimate, z(l, n) for l=1, ..., P, for that symbol period (block 714). The initial impulse response estimate may be expressed as:

$$z(l, n) = h(l, n) + \sum_{i=1}^{M} R_i(n) \cdot g_i(l, n) + \tilde{w}(l, n), \quad \text{Eq (10)}$$
$$\text{for } l = 1, \ldots, P,$$

where
h(l,n) is the l-th channel tap for the desired transmitter;
$g_i$(l,n) is the l-th channel tap for the i-th interfering transmitter;
z(l,n) is an estimate of the l-th channel tap for the desired transmitter; and
w̃(l,n) is the noise for the l-th channel tap.

In equation (10), the term $R_i(n) \cdot g_i(l,n)$ is for the l-th channel tap of the wireless channel from the i-th interfering transmitter to the receiver. Equation (10) indicates that each channel tap h(l,n) for the desired transmitter observes M corresponding channel taps for the M interfering transmitters.

The receiver removes the phase ramp across the P channel taps for each symbol period (block 716), as follows:

$$\tilde{z}(l, n) = W_K^{-k_n \cdot l} \cdot z(l, n) \quad \text{Eq (11)}$$
$$= e^{j2\pi \frac{(k_n-1)(l-1)}{K}} \cdot z(l, n),$$
$$\text{for } l = 1, \ldots, P,$$

where z̃(l,n) is the l-th channel tap for symbol period n after phase ramp removal. The receiver then accumulates the R channel taps, z̃(l,n) for n=1, ..., R, obtained across the pilot code length, for each tap index l (block 718). The receiver may perform truncation to retain the first L channel taps and zero out the remaining channel taps, e.g., as shown in equation (8) (block 720).

For pilot code scheme 1 in Table 1, the time-only pilot codes assigned to different transmitters are pseudo-random with respect to each other across time. $R_i(n)$ for each interfering transmitter then randomizes the pilot interference observed by each channel tap for the desired transmitter. For pilot code scheme 2 in Table 1, the time-only pilot codes assigned to different transmitters are orthogonal to one another across time. The channel responses for the interfering transmitters are then canceled by the code matching, unless the orthogonality is disturbed by time variations in the wireless channels for the desired and interfering transmitters.

The length (R) of the time-only pilot codes determines the number of transmitters that may be distinguished by the receiver with code matching. The pilot code length is typically constrained by (and selected to be shorter than) the time duration over which the wireless channel can be assumed to be static.

2. Frequency-Only Pilot Codes

For a frequency-only pilot code, the pilot code is the same for all symbol periods and only varies across subbands. The code symbols sent by the desired transmitter may be expressed as:

$$C(k) = S_0(k) \cdot P(k), \text{ for } k \in K_{pilot}(n), \quad \text{Eq (12)}$$

where C(k) is a code symbol sent on subband k by the desired transmitter.

The code symbols sent by each interfering transmitter may be expressed as:

$$X_i(k) = S_i(k) \cdot P(k), \text{ for } k \in K_{pilot}(n) \text{ and } i=1, \ldots, M, \quad \text{Eq (13)}$$

where $X_i(k)$ is a code symbol sent on subband k by the i-th interfering transmitter.

FIG. 8 shows a process 800 for deriving a channel estimate for the desired transmitter for a frequency-only pilot code. The receiver initially multiplies P received pilot symbols for one symbol period with the pilot code for the desired transmitter to obtain P detected symbols for that symbol period (block 812), as follows:

$$Z(k) = C^*(k) \cdot Y(k), \qquad \text{Eq (14)}$$

$$= H(k) + \sum_{i=1}^{M} G_i(k) \cdot R_i(k) + \tilde{W}(k), \text{ for } k \in K_{pilot}(n),$$

where $C(k) \cdot C^*(k) = 1$ and $R_i(k) = X_i(k) \cdot C^*(k)$.

The receiver then performs an inverse transform (e.g., an IDFT) on the P detected symbols to obtain a P-tap initial impulse response estimate (block 814). This initial impulse response estimate may be expressed as:

$$z(l) = h(l) + \sum_{i=1}^{M} v_i(l) + \tilde{w}(l), \text{ for } l = 1, \ldots, P, \qquad \text{Eq (15)}$$

where $v_i(l)$, for $l=1, \ldots, P$, is a P-tap "effective" channel impulse response for the i-th interfering transmitter. This effective channel impulse response may be expressed as:

$$\underline{v}_i = \underline{g}_i \otimes \underline{r}_i, \qquad \text{Eq (16)}$$

where
- $\underline{g}_i$ is a P-point IDFT of $G_i(k)$ for the P pilot subbands;
- $\underline{r}_i$ is a P-point IDFT of $R_i(k)$ for the P pilot subbands;
- $\otimes$ denotes a circular convolution; and
- $\underline{v}_i$ is a P-point IDFT of $V_i(k) = G_i(k) \cdot R_i(k)$ for the P pilot subbands.

In the following description, $\underline{f}$ with underlining denotes a sequence for $f(l)$ over an appropriate range of index l. For example, $\underline{v}_i$ is a sequence containing $v_i(l)$ for $l=1, \ldots, P$.

As shown in equation (15), the impulse response estimate $\underline{z}$ is equal to the actual channel impulse response $\underline{h}$ for the desired transmitter plus an effective channel impulse response $\underline{v}_i$ for each interfering transmitter plus noise. As shown in equation (16), the effective channel impulse response $\underline{v}_i$ for each interfering transmitter is equal to a circular convolution of the actual channel impulse response $\underline{g}_i$ and a time-domain code sequence $\underline{r}_i$ for that interfering transmitter. This time-domain code sequence $\underline{r}_i$ is the IDFT of the product of the pilot code $X_i(k)$ for the interfering transmitter and the complex conjugated pilot code $C^*(k)$ for the desired transmitter.

For pilot code scheme 3 in Table 1, the frequency-only pilot codes assigned to different transmitters are pseudo-random with respect to each other across frequency. In this case, the time-domain code sequence $\underline{r}_i$ for each interfering transmitter is a pseudo-random sequence that spreads (or smears) the L-tap channel impulse response $\underline{g}_i$ for the interfering transmitter over P taps. If L<P and the excess channel taps L+1 through P of the impulse response estimate $\underline{z}$ are set to zero via truncation, then the pilot interference in these excess channel taps are effectively canceled. The pilot interference in channel taps 1 through L is suppressed due to the spreading property of the pseudo-random frequency-only pilot codes.

For pilot code scheme 4 in Table 1, the frequency-only pilot codes assigned to different transmitters are defined to allow for pilot interference cancellation (instead of suppression) under certain conditions. The frequency-only pilot codes may be defined such that the time-domain code sequence $\underline{r}_i$ for each interfering transmitter has the following form:

$$r_i(l) = \begin{cases} 1 & \text{for } l = T_i \\ 0 & \text{for all other values of } l. \end{cases} \qquad \text{Eq (17)}$$

For the delta function shown in equation (17), the effective channel impulse response $\underline{v}_i$ for each interfering transmitter is simply equal to the undesired channel impulse response $\underline{g}_i$ circularly delayed (i.e., cyclically delayed or time rotated) by $T_i$ taps. If $T_i > L$ and $T_i + L \leq P$ for each interfering transmitter, then $\underline{g}_i$ is circularly delayed by $T_i$ taps, and the L circularly delayed channel taps fall between tap indices L+1 and P. These L circularly delayed channel taps may be completely removed by performing truncation on the impulse response estimate $\underline{z}$ and setting channel taps L+1 through P of $\underline{z}$ to zero (block 816). The final impulse response estimate for the desired transmitter would then contain only the first L channel taps of $\underline{z}$ and zeros for all remaining channel taps. For example, if there is only one interfering transmitter (or M=1) and if $T_i = L+1$ and $P > 2L$, then $\underline{g}_i$ is circularly delayed by L+1 taps and may be completely removed by setting channel taps L+1 through P of $\underline{z}$ to zero.

A cyclic-shift code that can provide the time-domain code sequence $\underline{r}_i$ shown in equation (17) may be expressed as:

$$F_i(k) = e^{j\frac{2\pi \cdot (k-1) \cdot T_i}{K}}, \text{ for } k = 1, \ldots, K, \qquad \text{Eq (18)}$$

where $T_i$ may be selected, for example, as $T_i = i \cdot L$. The function given in equation (18) corresponds to a progressive phase shift across the K total subbands. The phase shift changes at different rates (or has different phase slopes) for different transmitters. For each transmitter i, the P phase values at the P pilot subbands, $k \in K_{pilot}(n)$, are computed based on equation (18) and form the frequency-only code values for that transmitter. The same function $F_i(k)$ is used for each transmitter, but the P phase values are dependent on the specific subbands (or interlace) used for pilot transmission.

Figure 10:
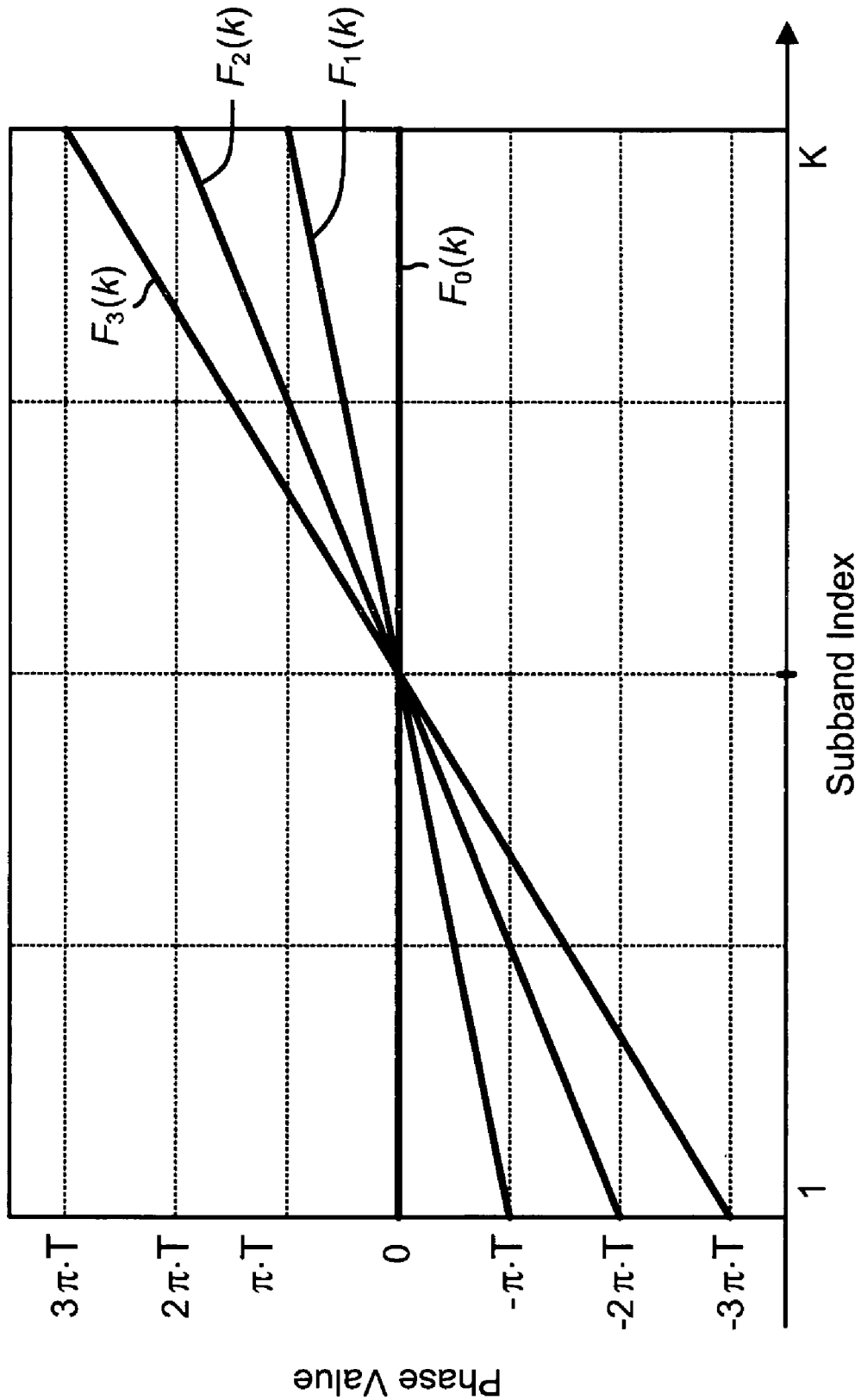
FIG. 10 shows phase plots of cyclic-shift codes for four transmitters.

FIG. 10 shows plots of the phase values across the K total subbands for four cyclic-shift codes for four transmitters. The function $F_i(k)$ in equation (18) creates a linear phase shift across the K total subbands. Each transmitter i, for $i=0, \ldots, M$, is associated with a phase slope of $2\pi \cdot T_i/K$, where $T_i = i \cdot T$ and M=3 in FIG. 10. For transmitter i, the phase value for each subband k is given as $2\pi \cdot (k-1) \cdot T_i/K$. A phase offset so that the center subband at $k = K/2+1$ has a phase value of zero.

The cyclic-shift code shown in equation (18) is applied across the P pilot subbands at the transmitter and results in a circular or cyclic delay for the channel response estimate for that transmitter. This circular delay is relatively long and may be selected to be longer than the channel length L. This is in contrast to the normal use of cyclic delay to provide diversity, which typically requires the cyclic delay to be much smaller than the channel length L.

Figure 11:
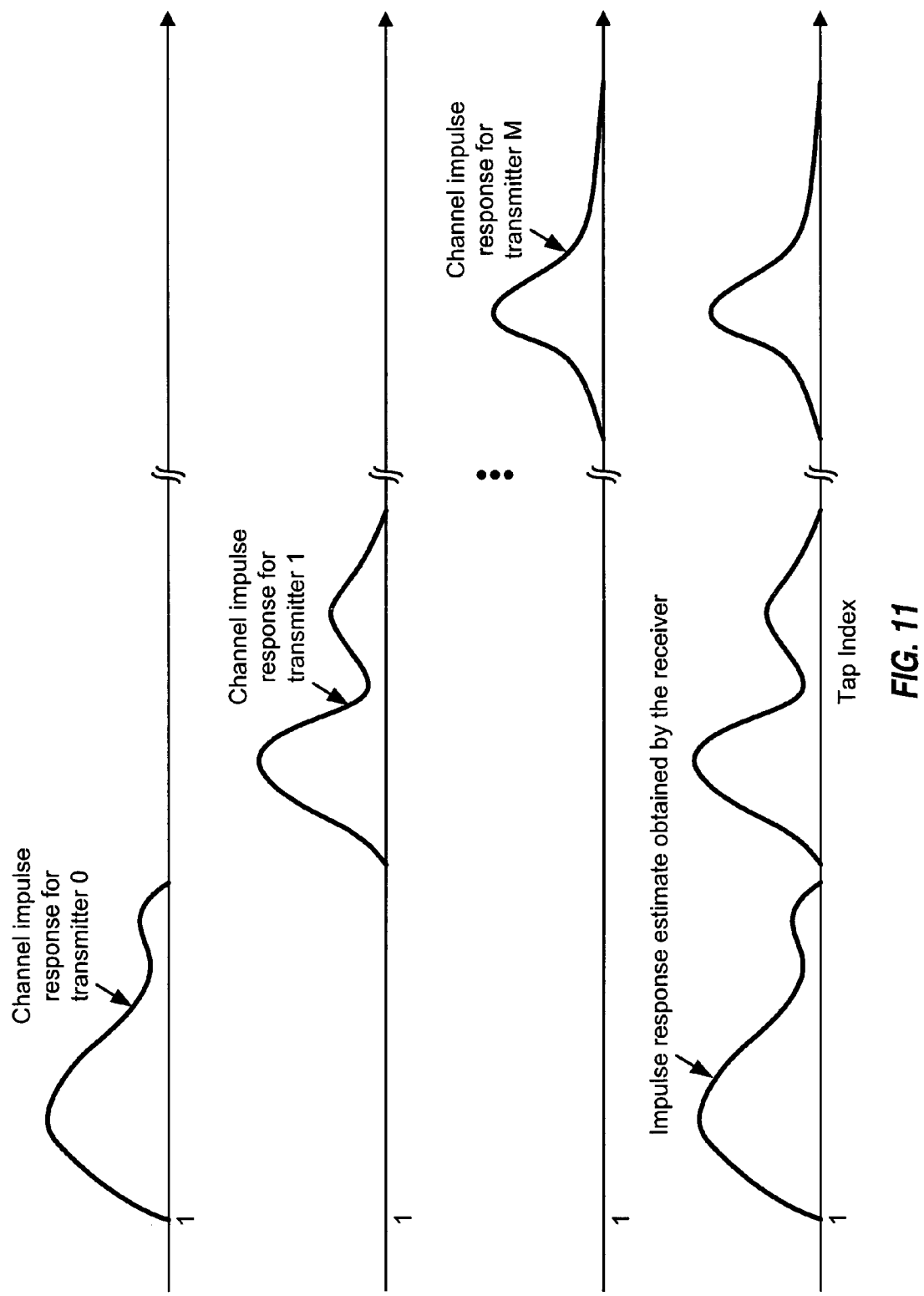
FIG. 11 illustrates channel impulse responses for multiple transmitters with cyclic-shift codes.

FIG. 11 shows the channel impulse responses for multiple transmitters with the cyclic-shift codes. The channel impulse responses for transmitters 0, 1, and M are shown at the top of FIG. 11. The channel impulse response for each transmitter starts at a different tap index, which is determined by its cyclic-shift code. The multiplication of the received pilot symbols with the cyclic-shift code for the desired transmitter circularly shifts the channel impulse responses for all transmitters such that the channel impulse response for the desired transmitter starts at tap index 1. The truncation of the channel taps with indices greater than L removes the channel impulse responses for all interfering transmitters.

Pilot interference cancellation using cyclic-shift codes may be used for any number of interfering transmitters. The pilot codes may be defined such that the time-domain code sequence $\underline{r}_i$ for the i-th interfering transmitter has a value of 1 for tap index $l=i \cdot L+1$ and values of 0 for all other tap indices. The channel impulse response $\underline{g}_i$ for the i-th interfering transmitter is then circularly shifted by $i \cdot L+1$. If $P \geq M \cdot L$, then the channel impulse responses for all M interfering transmitters may be completely canceled by setting channel taps $L+1$ through P of the impulse response estimate $\underline{z}$ to zero.

If $P<M \cdot L$, then a portion of the channel impulse response $\underline{g}_i$ for an interfering transmitter may fall within the first L taps of the impulse response estimate $\underline{z}$ after the circular delay by $\underline{r}_i$. This portion cannot be canceled and degrades the estimate of the desired channel impulse response $\underline{h}$. P may be effectively increased by using a staggered pilot, e.g., as shown in FIG. 4. The staggered pilot increases the total number of pilot subbands observed by the receiver without increasing the number of pilot subbands used for pilot transmission in any one symbol period.

FIG. 9 shows a process 900 for deriving a channel estimate for the desired transmitter, which transmits a staggered pilot using a cyclic-shift code. The receiver multiplies P received pilot symbols for each symbol period n with the cyclic-shift code for the desired transmitter and obtains P detected symbols for that symbol period (block 912). The detected symbols may be expressed as:

$$Z(k,n)=F^*_0(k,n) \cdot Y(k,n), \text{ for } k \in K_{pilot}(n), \quad \text{Eq (19)}$$

where $F_0(k,n)$ is a cyclic-shift code for the desired transmitter for symbol period n. For each symbol period n, $F_0(k,n)$ provides P phase values generated based on equation (18) for $k \in K_{pilot}(n)$, where $K_{pilot}(n)=\{k_n, k_n+S, 2k_n+S, \ldots, k_n+(P-1) \cdot S\}$. $F_0(k,n)$ is a function of symbol period because $K_{pilot}(n)$ is a function of symbol period.

Each interlace is associated with a different set of pilot subbands and hence a different set of phase values for the cyclic-shift code. The S sets of phase values for the S interlaces are all generated with the same cyclic-shift code assigned to the transmitter, as shown in equation (18). The P received pilot symbols for each symbol period are multiplied with the P phase values for the interlace used for pilot transmission in that symbol period. Since different interlaces are used for pilot transmission in different symbol periods for the staggered pilot, different sets of phase values are also used for different symbol periods.

If $S_p$ different interlaces are used for pilot transmission in $S_p$ symbol periods, then the receiver obtains $S_p$ sets of P detected symbols for the $S_p$ symbol periods. The receiver forms a sequence of $P_T$ detected symbols with the $S_p$ sets of P detected symbols, where $P_T=S_p \cdot P$ (block 914). These $P_T$ detected symbols are for $P_T$ different pilot subbands. The receiver then performs an inverse transform (e.g., an IDFT) on the sequence of $P_T$ detected symbols to obtain an initial impulse response estimate with $P_T$ channel taps (block 916). The receiver then performs truncation to set channel taps $L+1$ through $P_T$ to zero (block 918).

If $P<M \cdot L$ for the fixed pilot transmission scheme or $P_T<M \cdot L$ for the staggered pilot transmission scheme, then the cyclic-shift codes may be designed such that the time-domain code sequences $\underline{r}_i$ for the interfering transmitters have channel impulse responses that are separated by less than L, e.g., at $T_i=i \cdot P/M$ or $T_i=i \cdot P_T/M$. These semi-orthogonal pilot codes may circularly shift out most of the interfering energy and may achieve a large amount of pilot interference cancellation even with $P<M \cdot L$ or $P_T<M \cdot L$.

3. Time-Frequency Pilot Codes

For a time-frequency pilot code, the pilot code varies across both subbands and symbol periods. The code symbols sent by the desired transmitter may be expressed as:

$$C(k,n)=S_0(k,n) \cdot P(k), \text{ for } k \in K_{pilot}(n), \quad \text{Eq (20)}$$

where $C(k,n)$ is a code symbol sent on subband k in symbol period n by the desired transmitter.

The code symbols sent by each interfering transmitter may be expressed as:

$$X_i(k,n)=S_i(k,n) \cdot P(k), \text{ for } k \in K_{pilot}(n) \text{ and } i=1, \ldots, M, \quad \text{Eq (21)}$$

where $X_i(k,n)$ is a code symbol sent on subband k in symbol period n by the i-th interfering transmitter.

The received pilot symbols obtained by the receiver with the transmitters using time-frequency pilot codes are shown in equation (4). The receiver may obtain a channel estimate for the desired transmitter in various manners.

Figure 12:
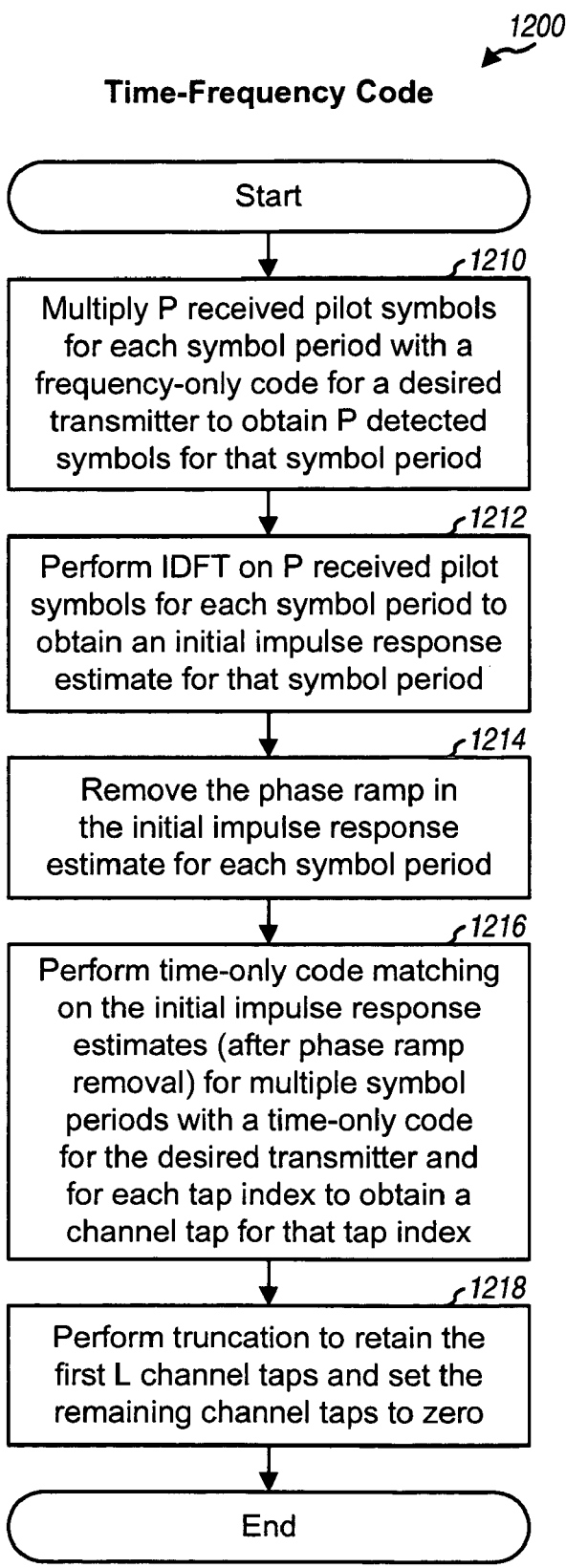
FIG. 12 shows a channel estimation process for a time-frequency pilot code.

FIG. 12 shows a process 1200 for deriving a channel estimate for the desired transmitter, which uses a time-frequency pilot code $S_0(k,n)$ that is composed of a frequency-only code $F_0(k)$ and a time-only code $T_0(n)$, as shown in equation (1). The frequency-only code may be a pseudo-random code, a cyclic-shift code, and so on. The time-only code may be a pseudo-random code, and orthogonal code, and so on. Process 1200 may be used for pilot code schemes 5 through 8 in Table 1.

The receiver multiplies P received pilot symbols, $Y(k,n)$ for $k \in K_{pilot}(n)$, for each symbol period n with the frequency-only code to obtain P detected symbols, $Z(k,n)$ for $k \in K_{pilot}(n)$, for that symbol period (block 1210). The detected symbols may be expressed as:

$$Z(k, n) = F^*_0(k) \cdot Y(k, n), \quad \text{for } k \in K_{pilot}(n), \quad \text{Eq (22)}$$

$$= H(k, n) + \sum_{i=1}^{M} G_i(k, n) \cdot R_i(k, n) + \tilde{W}(k, n),$$

where $R_i(k,n)=X_i(k,n) \cdot F^*_0(k)$. The frequency-only code $F_0(k)$ may be a function of symbol period for the cyclic-shift code with a staggered pilot, as described above.

The receiver next performs an inverse transform (e.g., an IDFT) on the P detected symbols for each symbol period to obtain a P-tap initial impulse response estimate for that symbol period (block 1212). The receiver then removes the phase ramp across the P channel taps for each symbol period (block 1214), e.g., as shown in equation (11). The receiver then performs time-only code matching on the initial impulse response estimates (after phase ramp removal) for multiple symbol periods with the time-only code $T_0(n)$ (block 1216). The time-only code matching is performed for each tap index/position l, e.g., similar to that shown in equation (7). For each tap index l, the receiver multiplies the channel taps at that tap index for different symbol periods with the conjugated time-only code, $T^*_0(k)$, and accumulates over the length of the time-only code to obtain a channel tap for that tap index. The receiver then performs truncation to retain the first L channel taps and zero out the remaining taps (block 1218).

In an alternative channel estimation scheme for time-frequency pilot code, the receiver multiplies the received pilot symbols with both the frequency-only code and the time-only code to obtain detected symbols having the entire pilot code removed. The receiver then accumulates the detected symbols across multiple symbol periods for each subband k to obtain a combined symbol for that subband. The receiver then performs an IDFT on the combined symbols to obtain an initial channel response estimate and further performs truncation to retain the first L channel taps.

Pilot code schemes 7 and 8 in Table 1 may be used in various manners. In one embodiment, each transmitter is assigned a different cyclic-shift code $F_i(k)$ for a different delay $T_i$. For this embodiment, the channel impulse response for each transmitter may be obtained with circular delay (achieved by the frequency-only code matching) and truncation. The time-only code matching across symbol periods improves the quality of the channel estimate. In another embodiment, multiple groups of transmitters are formed, and each transmitter group is assigned the same cyclic-shift code. The transmitters within each group are further assigned different (e.g., orthogonal) time-only codes $T_i(n)$. The receiver may obtain the channel estimates for each group of transmitters by performing frequency-only code matching with the cyclic-shift code $F_i(k)$ assigned to that group. This frequency-only code matching circularly shifts the channel impulse responses for all other transmitters to higher tap indices so that these channel impulse responses can be canceled through truncation. The receiver may then obtain the channel estimate for individual transmitters within the selected group by performing time-only code matching with the different time-only codes assigned to these transmitters.

For all of the pilot code schemes, the receiver may obtain the final impulse response estimate for the desired transmitter as described above. The receiver may perform filtering to further improve the quality of the final impulse response estimate. The receiver may also perform thresholding and zero out channel taps having energy below a predetermined threshold. The receiver may extend the final impulse response estimate to length K by appending zeros. The receiver may then perform a K-point forward transform (e.g., a DFT) on the extended impulse response estimate to obtain a frequency response estimate with channel gains for all K total subbands.

The pilot transmission and channel estimation techniques described herein may be implemented by various means. For example, these techniques may be implemented in hardware, software, or a combination thereof. For a hardware implementation, the processing units used for pilot transmission at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for channel estimation at a receiver may also be implemented within one or more ASICs, DSPs, processors, and so on.

For a software implementation, the techniques described herein may be implemented with modules (e.g., procedures, functions, and so on) that perform the functions described herein. The software codes may be stored in a memory unit (e.g., memory unit 142 or 192 in FIG. 1) and executed by a processor (e.g., controller 140 or 190). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing channel estimation in a wireless communication system, comprising:
   deriving a plurality of initial impulse response estimates for a plurality of symbol periods; and
   performing code matching on the plurality of initial impulse response estimates with a first code for a transmitter to obtain a final impulse response estimate for the transmitter.

2. The method of claim 1, wherein the deriving the plurality of initial impulse response estimates comprises
   obtaining a set of received symbols for a set of frequency subbands in each of the plurality of symbol periods, and
   performing an inverse transform on the set of received symbols for each symbol period to derive an initial impulse response estimate for the symbol period.

3. The method of claim 1, wherein the deriving the plurality of initial impulse response estimates comprises
   obtaining a set of received symbols for a set of frequency subbands in each of the plurality of symbol periods, wherein at least two different sets of frequency subbands are used for pilot transmission, and
   performing an inverse transform on the set of received symbols for each symbol period to derive an initial impulse response estimate for the symbol period.

4. The method of claim 1, further comprising:
   removing a phase ramp in each of the plurality of initial impulse response estimates.

5. The method of claim 1, further comprising:
   determining a set of frequency subbands used for pilot transmission in each symbol period, wherein at least two different sets of frequency subbands are used for pilot transmission in the plurality of symbol periods; and
   removing a phase ramp in each initial impulse response estimate for each symbol period based on the set of frequency subbands used for pilot transmission in the symbol period.

6. The method of claim 1, wherein the performing code matching comprises, for each tap position among a plurality of tap positions,
   identifying a plurality of channel taps at the tap position in the plurality of initial impulse response estimates,
   multiplying the plurality of channel taps with a plurality of code values for the first code to obtain a plurality of intermediate values, and
   accumulating the plurality of intermediate values to obtain a channel tap at the tap position in the final impulse response estimate.

7. The method of claim 1, further comprising:
   deriving a plurality of sets of detected symbols for the plurality of symbol periods based on a second code for the transmitter.

8. The method of claim 7, wherein the deriving the plurality of initial impulse response estimates comprises performing an inverse transform on a set of detected symbols for each symbol period to derive an initial impulse response estimate for the symbol period.

9. The method of claim 7, wherein the deriving the plurality of sets of detected symbols comprises, for each of the plurality of symbol periods,
determining a set of code values based on the second code and a set of frequency subbands used for pilot transmission in the symbol period, and
multiplying a set of received symbols for the symbol period with the set of code values to obtain a set of detected symbols for the symbol period.

10. The method of claim 1, further comprising:
retaining first L channel taps in the final impulse response estimate, where L is an integer greater than one; and
setting remaining channel taps in the final impulse response estimate to zero.

11. The method of claim 1, further comprising:
setting channel taps in the final impulse response estimate with magnitude below a predetermined threshold to zero.

12. An apparatus in a wireless communication system, comprising:
a channel estimator operative to derive a plurality of initial impulse response estimates for a plurality of symbol periods and to perform code matching on the plurality of initial impulse response estimates with a first code for a transmitter to obtain a final impulse response estimate for the transmitter.

13. The apparatus of claim 12, further comprising:
a demodulator operative to provide a set of received symbols for a set of frequency subbands in each of the plurality of symbol periods, and
wherein the channel estimator is operative to perform an inverse transform on the set of received symbols for each symbol period to derive an initial impulse response estimate for the symbol period.

14. The apparatus of claim 12, wherein the channel estimator is operative to, for each tap position among a plurality of tap positions,
identify a plurality of channel taps at the tap position in the plurality of initial impulse response estimates,
multiply the plurality of channel taps with a plurality of code values for the first code to obtain a plurality of intermediate values, and
accumulate the plurality of intermediate values to obtain a channel tap at the tap position in the final impulse response estimate.

15. The apparatus of claim 12, wherein the channel estimator is operative to retain first L channel taps in the final impulse response estimate and to set remaining channel taps in the final impulse response estimate to zero, where L is an integer greater than one.

16. The apparatus of claim 12, wherein the channel estimator is operative to derive a plurality of sets of detected symbols for the plurality of symbol periods based on a second code for the transmitter and to perform an inverse transform on a set of detected symbols for each symbol period to derive an initial impulse response estimate for the symbol period.

17. The apparatus of claim 12, wherein the first code for the transmitter is orthogonal to at least one other first code for at least one other transmitter.

18. The apparatus of claim 12, wherein the first code for the transmitter is pseudo-random with respect to at least one other first code for at least one other transmitter.

19. The apparatus of claim 16, wherein the second code for the transmitter is pseudo-random with respect to at least one other second code for at least one other transmitter.

20. The apparatus of claim 16, wherein the second code for the transmitter is a cyclic-shift code.

21. An apparatus in a wireless communication system, comprising:
means for deriving a plurality of initial impulse response estimates for a plurality of symbol periods; and
means for performing code matching on the plurality of initial impulse response estimates with a first code for a transmitter to obtain a final impulse response estimate for the transmitter.

22. The apparatus of claim 21, wherein the means for deriving the plurality of initial impulse response estimates comprises
means for obtaining a set of received symbols for a set of frequency subbands in each of the plurality of symbol periods, and
means for performing an inverse transform on the set of received symbols for each symbol period to derive an initial impulse response estimate for the symbol period.

23. The apparatus of claim 21, wherein the means for performing code matching comprises, for each tap position among a plurality of tap positions,
means for identifying a plurality of channel taps at the tap position in the plurality of initial impulse response estimates,
means for multiplying the plurality of channel taps with a plurality of code values for the first code to obtain a plurality of intermediate values, and
means for accumulating the plurality of intermediate values to obtain a channel tap at the tap position in the final impulse response estimate.

24. The apparatus of claim 21, further comprising:
means for retaining first L channel taps in the final impulse response estimate, where L is an integer greater than one; and
means for setting remaining channel taps in the final impulse response estimate to zero.

25. The apparatus of claim 21, further comprising:
means for deriving a plurality of sets of detected symbols for the plurality of symbol periods based on a second code for the transmitter, and
wherein the means for deriving the plurality of initial impulse response estimates comprises means for performing an inverse transform on a set of detected symbols for each symbol period to derive an initial impulse response estimate for the symbol period.

26. An apparatus in a wireless communication system, comprising:
a demodulator operative to provide a plurality of sets of received symbols for a plurality of symbol periods; and
a channel estimator operative to derive a plurality of sets of detected symbols based on the plurality of sets of received symbols and a cyclic-shift code for a transmitter, to derive at least one initial impulse response estimate based on the plurality of sets of detected symbols, and to derive a final impulse response estimate for the transmitter based on the at least one initial impulse response estimate.

27. The apparatus of claim 26, wherein the channel estimator is operative to form a sequence of detected symbols with the plurality of sets of detected symbols and to perform an inverse transform on the sequence of detected symbols to derive a single initial impulse response estimate.

28. The apparatus of claim 26, wherein the channel estimator is operative to derive a plurality of initial impulse response estimates for a plurality of code values for a second code for the transmitter and to perform code matching on the plurality of initial impulse response estimates with the second code.

29. An apparatus in a wireless communication system, comprising:
- means for deriving a plurality of sets of detected symbols based on a plurality of sets of received symbols for a plurality of symbol periods and a cyclic-shift code for a transmitter;
- means for deriving at least one initial impulse response estimate based on the plurality of sets of detected symbols; and
- means for deriving a final impulse response estimate for the transmitter based on the at least one initial impulse response estimate.

30. The apparatus of claim 29, wherein the means for deriving at least one initial impulse response estimate comprises
- means for forming a sequence of detected symbols with the plurality of sets of detected symbols, and
- means for performing an inverse transform on the sequence of detected symbols to derive a single initial impulse response estimate.

31. The apparatus of claim 29, wherein the means for deriving the at least one initial impulse response estimate comprises, for each code value among a plurality of code values for a second code for the transmitter,
- means for forming a sequence of detected symbols with at least one set of detected symbols for which the code value applies, and means for performing an inverse transform on the sequence of detected symbols to derive an initial impulse response estimate for the code value.

32. The apparatus of claim 31, wherein the means for deriving the final impulse response estimate comprises
- means for performing code matching on a plurality of initial impulse response estimates, derived for the plurality of code values, with the second code.

* * * * *